United States Patent [19]
Jenekhe et al.

[11] Patent Number: 5,114,610
[45] Date of Patent: * May 19, 1992

[54] SOLUBILIZING POLYMERS WITH AN ORGANIC SOLVENT SYSTEM

[75] Inventors: Samson A. Jenekhe, Rochester, N.Y.; James R. Peterson, St. Paul, Minn.

[73] Assignee: Honeywell Inc., Minneapolis, Minn.

[ * ] Notice: The portion of the term of this patent subsequent to Jul. 31, 2007 has been disclaimed.

[21] Appl. No.: 492,201

[22] Filed: Mar. 12, 1990

Related U.S. Application Data

[63] Continuation of Ser. No. 291,815, Dec. 29, 1988, abandoned.

[51] Int. Cl.⁵ .............................. C09K 3/00; C09B 3/02
[52] U.S. Cl. .............................. 252/182.33; 252/363.5; 252/364; 252/500; 524/924
[58] Field of Search ................ 252/182.33, 364, 363.5, 252/500; 524/924

[56] References Cited

U.S. PATENT DOCUMENTS

| | | | |
|---|---|---|---|
| 3,992,310 | 11/1976 | Forbes et al. | 585/11 |
| 4,058,400 | 11/1977 | Crivello | 96/86 P |
| 4,068,676 | 1/1978 | Thorn et al. | 252/263.5 |
| 4,163,645 | 8/1979 | Cheng et al. | 44/62 |
| 4,229,611 | 10/1980 | Kramer | 585/747 |
| 4,352,748 | 10/1982 | Traas et al. | 252/522 R |
| 4,392,000 | 7/1983 | Ryckaert et al. | 570/104 |
| 4,673,717 | 6/1987 | Percec et al. | 525/390 |
| 4,945,156 | 7/1990 | Jenekhe et al. | 528/485 |
| 4,963,616 | 10/1990 | Jenekhe et al. | 252/500 |

OTHER PUBLICATIONS

"Periodic Table of the Elements", E. H. Sargent Co., 2pp. (1962).

*Primary Examiner*—Edward A. Miller
*Attorney, Agent, or Firm*—Michael B. Atlass; Charles Mersereau

[57] ABSTRACT

Solubilizing macromolecules including rigid chain and ladder polymers with Lewis acids dissolved in aprotic organic solvents. The resulting isotropic or anisotropic solutions are useful for producing films, coatings, fibers, and other forms of the macromolecules.

33 Claims, 2 Drawing Sheets

SOLUBILIZING POLYMERS WITH AN ORGANIC SOLVENT SYSTEM

The Government has rights in this invention, pursuant to a contract awarded by the Department of the Air Force.

This is a division of copending application Ser. No. 07/291,815, filed on Dec. 29, 1988, now abandoned.

CROSS-REFERENCE TO RELATED APPLICATION

Reference is made to applications Ser. No. 07/291,792 now U.S. Pat. No. 4,945,156 entitled "SOLUTION PROCESSING OF RIGID CHAIN AND LADDER POLYMERS" and application Ser. No. 07/291,924, now U.S. Pat. No. 4,963,616 entitled "COMPLEXATION - MEDIATED SOLUBILIZATION OF POLYMERS" both filed of even date and assigned to the same assignee as the present application. The inventions of those applications address unique but related subject matter.

BACKGROUND OF THE INVENTION

1. Field of the Invention

The present invention relates generally to solvents for solubilization and processing of organic polymers to useful forms as films, coatings, or fibers and, more particularly, to solvent systems containing Lewis acids and aprotic organic liquids for producing isotropic or anisotropic solutions of rigid chain or ladder polymers.

2. Related Art

Numerous rigid chain or ladder polymers have been synthesized in the past few decades and shown to exhibit exceptional high temperature stability, very high mechanical strength, resistance to solvents, and generally excellent environmental stability. Polymeric materials with these properties are of technological interest for diverse applications, including as structural materials in engineering structures and aerospace vehicles, as dielectric materials in electronics, as engine components, and as heat-resistant coatings.

Rigid chain polymers are exemplified by poly(p-phenylene-2,6-benzoxazole) (PBO), of the structure

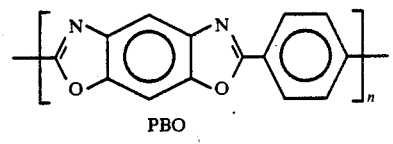

PBO (I)

poly(p-phenylene-2,6-benzothiazole) (PBT), of the structure

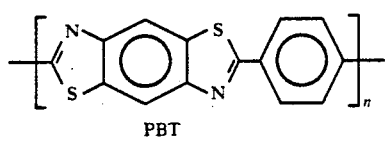

PBT (II)

poly(p-phenylene-2,6-benzimidazole) (PBI), of the structure

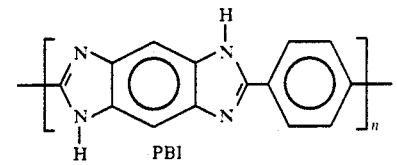

PBI (III)

and the so-called ladder structures, for example, by benzimidazobenzo-phenanthroline-type ladder polymer (BBL) and derivatives, five of whose structures are also shown below.

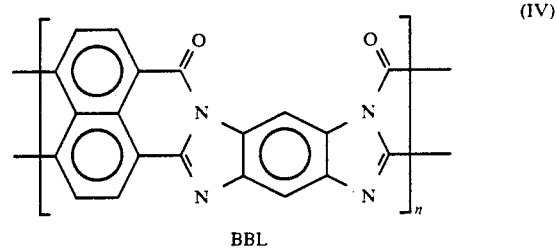

BBL (IV)

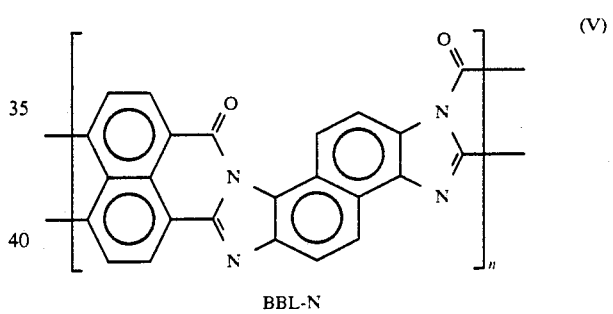

BBL-N (V)

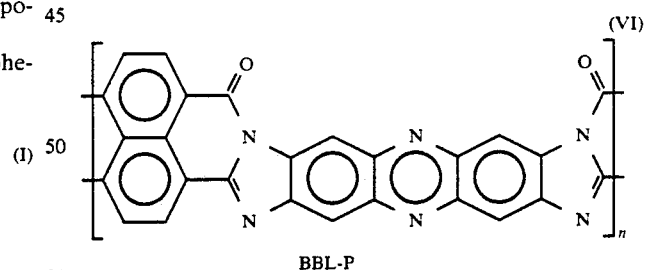

BBL-P (VI)

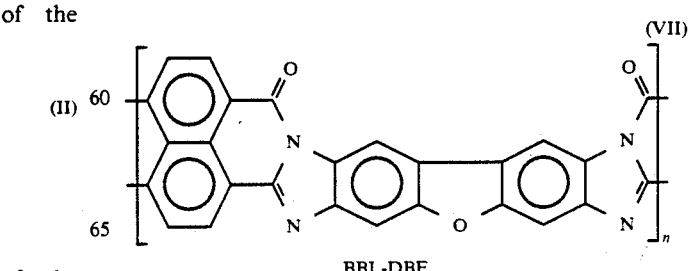

BBL-DBF (VII)

-continued

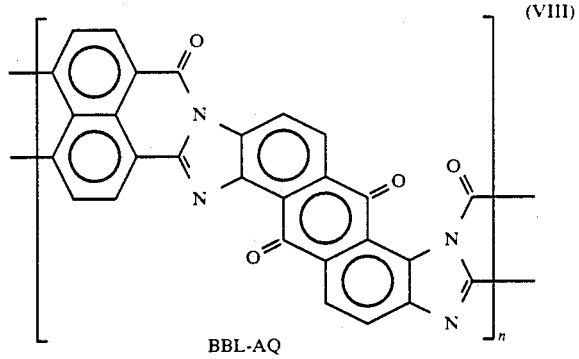

BBL-AQ                                                                 (VIII)

Other examples of ladder polymers include the polyhydroquinoxaline ladder structure,

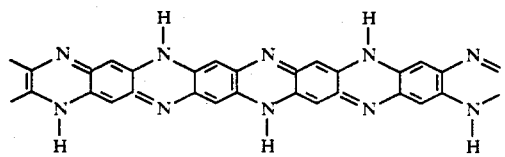

PHQXL                                                                   (IX)

whose oligomeric model compound 5,12-dihydro-5,7,12,14-tetraazapentacene (DHTAP) has the structure

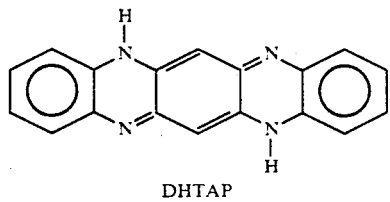

DHTAP                                                                   (X)

The semi-ladder polybenzimidazobenzophenan-throline (BBB) of structure,

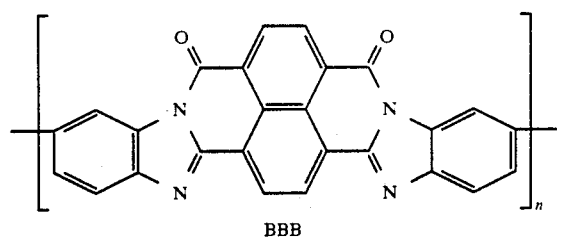

BBB                                                                     (XI)

and its oligomeric model compound cis-BB of the structure,

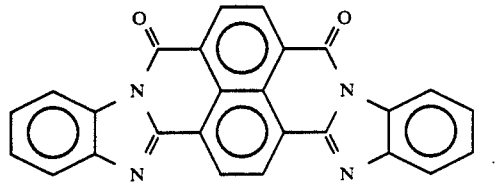

CIS-BB                                                                  (XII)

also exemplify the rigid chain and thermally stable polymers in structural and physical properties. Other notable polymers in this regard include the non-fused polybenzimidazole (X=N-H) and derivatives with the structure,

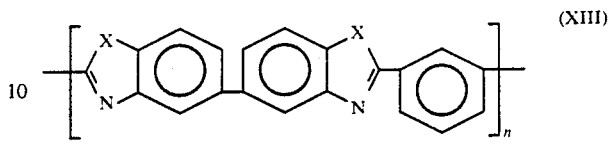                                                    (XIII)

and the aromatic polyimides of the structure

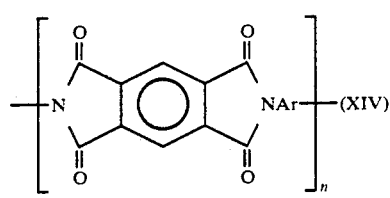                                                    (XIV)

such as poly [N,N'-bis(phenoxyphenyl)pyrromellitimide) or Kapton (Trademark of the duPont Co).

More recently, these rigid chain or ladder polymers, such as exemplified in structures I to XIV, have shown useful electronic and optical properties in addition to their excellent thermal stability and mechanical properties and thus are of further technological interest as novel materials for electronic, electro-optic, and optical applications.

However, these rigid chain and ladder polymers and even those modified with pendant groups, have generally been insoluble in aprotic organic solvents from which their solutions could be processed by standard polymer film, coating or fiber processing techniques. Furthermore, their melting points are generally above their decomposition temperatures which are well in excess of 400°-600° C. The general insolubility of these types of polymers in organic solvents can be attributed to two main factors inherent in their molecular architecture: (a) intramolecular or conformational effects, particularly the rigidity of the polymer chains; and (b) intermolecular effects, especially strong interchain interactions.

Heretofore, strong and corrosive concentrated acids, such as methanesulfonic acid (MSA), triflic acid ($CF_3SO_3H$), and sulfuric acid, are solvents which have been used to characterize their properties and process them into films or fibers. The observed solubility of these polymers in strong protic acids is generally thought to originate from protonation of the polymer chains to form polyelectrolytes, such as shown below for BBL,

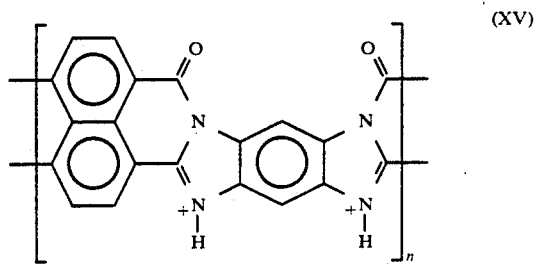                                                    (XV)

BBL with consequent significant reduction of the intermolecular attractions and the rigidity of the chain. The major disadvantages of using these strong acid solutions for large-scale production of films and fibers of these rigid chain and ladder polymers include the highly corrosive and toxic nature of the solvents; in addition, the acids are not volatile and are generally difficult to remove from the polymer films or fibers.

In the related art, processing of rigid chain para-linked aromatic polyamides such as poly(1,4-benzamide) (PBA),

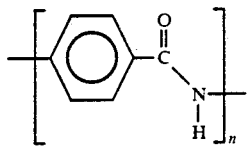

PBA (XVI)

and poly(1,4-phenyleneterephthalamide) (PPTA) or Kevlar (Trademark of the E.I. duPont Co.),

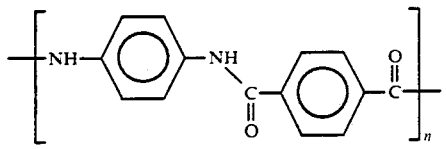

PPTA (XVII)

to fibers and films is achieved by their successful solubilization in a binary solvent system consisting of LiCl or $CaCl_2$ dissolved in amide solvents such as N,N-dimethylformamide (DMF), N,N-dimethylacetamide (DMAc and N-methylpyrrolidone (NMP).

Typically, PBA, PPTA or related rod-like aromatic polyamides can be dissolved in the aprotic organic solvents (DMF, DMAC, NMP) containing 3-15% wt LiCl or $CaCl_2$. At sufficiently high PBA or PPTA concentrations in LiCl/amide or $CaCl_2$/amide solvents, liquid-crystalline solutions can be obtained. Such liquid-crystalline polymer solutions are used to prepare high-strength, high-modulus oriented fibers as disclosed by S. L Kwolek, et al (U.S. Pat. Nos. 3,600,350 and 3,819,587, and *Macromolecules* 10, 1390-1396, 1977). However, these salt/amide solvent systems, such as LiCl/DMF, LiCl/DMAc, LiCl/NMP, etc. do not solubilize the class of rigid chain thermally stable polymers exemplified by the polymer structures I to XIV.

Some researchers have reported successful solubilization of certain rigid chain, conjugated, or ladder polymers in pure Lewis acids in the molten or liquid state. One of the present inventors, S. A. Jenekhe, and his co-workers have disclosed the successful solubilization of polycarbazoles of the structure,

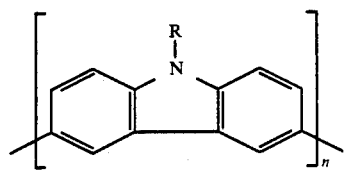

(XVIII)

in molten iodine (m.p. =106° C.), resulting in conducting polymer solutions from which doped conducting films of polycarbazoles can be obtained (Jenekhe et al, U.S. Pat. No. 4,568,482 of common assignment with the present invention) and *Molecular Crystals and Liquid Crystals* 105, 175, 1984). The solubilization of poly(p-phenylene sulfide) (PPS) of the structure,

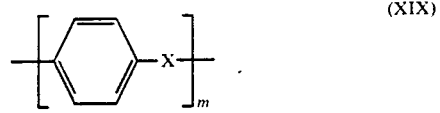

(XIX)

where X=S, in liquid $AsF_3/AsF_5$ to produce conducting solutions from which conducting films of PPS can be obtained has been reported by Frommer (J.E. Frommer, *Accounts of Chemical Research* 19, 2-9, 1986).

The solubilization of a rigid chain polymer, polybis-benzimidazobenzophenathroline-dione (BBB), of the structure XII, in molten antimony trichloride ($SbCl_3$) (m.p. =73.C) has been reported by Berry et al (G. C. Berry and S. M. Liwak, *J. Polym. Sci.: Polym. Phys. Ed.* 14, 1717, 1976). In studies by the present inventors, some of the rigid chain and ladder polymers of structures I-XIV, and related polymers, have been found to dissolve in some liquid or molten pure Lewis acids such as $SbCl_3$ and $AsF_3$ but do not dissolve in others such as $SbCl_5$, and $SbF_5$.

Nevertheless, these pure liquid or molten Lewis acids are not practical solvents for potential large-scale processing of the rigid chain thermally stable polymers to films, coatings, or fibers, for obvious technical, environmental, and economic reasons. Thus, the problems of solubilization of rigid chain thermally stable polymers in suitable organic solvents, and consequently, the lack of methods for their ready processing to films, coatings, fibers, and other forms, remain a major obstacle to the commercial uses of these polymers which otherwise have many desired and interesting electronic, optical, thermal stability, and mechanical properties.

SUMMARY OF THE INVENTION

The present invention provides new organic solvent systems for dissolving rigid chain or ladder polymers to produce isotropic or anisotropic solutions that are useful for preparing films, coatings, or fibers of the rigid chain thermally stable polymers such as exemplified by structures I-XIV.

The new organic solvent systems of the present invention consist of aprotic organic liquids in which Lewis acids are dissolved. The effectiveness of any member of this class of organic solvents in solubilizing a given amount of a rigid chain polymer of interest depends on its composition and nature; that is, the nature and amount of the Lewis acid in solution and the nature of the neat aprotic organic solvents prior to adding the Lewis acid.

Suitable Lewis acids include compounds $MX_n$, where M is a metal element from the Periodic Table such as Al, B, Ga, Fe, In, Sn, Sb, Ti, Zr, Hf, Nb, Ta, Mo, Ca, W, Pt, Re, Zn, Bi, As, Ir, Mn, Au, Cu, Cr, Wo, V, Yb, Y, Nd, Co, Os, Cd, Cs, Be, Ge, Rh, Ni, Pd, Tm, Tb, Te, Sc, Dx, Er, Eu, La, Lu, Sm, Pr, Ru and X is a halide (Cl, F, Br, or I) and n = 1, 2, 3, 4, 5, or 6. Thus, suitable Lewis acids include: $FeCl_3$, $SbCl_3$, $AlCl_3$, $SbCl_5$, $AlBr_3$, $AlI_3$, $GaCl_3$, $BCl_3$, $GaBr_3$, $GaI_3$, $GaCl_2$, $FeCl_2$, $InBr_3$, $InI_3$, $InCl_3$, $SnCl_4$, $TiCl_4$, $TiBr_4$, $ZrCl_4$, $HfCl_4$, $SbF_5$, $AuCl_3$, ZrBr$_4$, ZrI$_4$, PtCl$_4$, ReCl$_3$, ReCl$_5$, WCl$_6$, MoCl$_5$, MoF$_6$, TaCl$_5$, TaBr$_5$, TaF$_5$, NbF$_5$, NbCl$_5$, and AsF$_3$.

Suitable aprotic organic solvents include those with low electron donor properties and high electron acceptor properties. Thus suitable solvents include the nitroalkanes and nitroarenes such as nitromethane (bp =101° C.), nitroethane (bp=114° C.), 2-nitropropane (bp =120° C.), 1-nitropropane (bp=131° C.), nitrobenzene (bp =210°-211° C.), 2-nitrotoluene (bp=225° C.), 3-nitrotoluene (bp=230°-231° C., m.p.=5°-16° C.), 4-nitrotoluene (m.p. =52°-54° C., bp=238° C.), chlorobenzene, 1, 2-dichloroethane (DCE), toluene, p-xylene, tetrachlorothylene carbonate, dichloroethylene carbonate, benzene, benzyl chloride, thionyl chloride, nitroxylenes, and their mixtures.

Suitable amounts of the Lewis acid in an aprotic organic solvent necessary to provide an effective solvent system for dissolving rigid chain polymers, ladder polymers, and related macromolecules, of course, depend on the desired solution properties. These include desired macromolecular concentration in the solution, viscosity, and solution morphology, and the polymer to be dissolved; in general, suitable concentrations of MX$_n$ in an organic liquid cover a very wide range. The solution may be anywhere from very dilute to saturated, e.g., 0.01 Molar to 8 Molar or about 0.1% (wt) to 60% (wt). The solvent systems of the invention have been found to dissolve rigid chain or ladder polymers to produce isotropic or liquid-crystalline solutions useful for processing to films, coatings, sheets, fibers, and other forms. They have also been found useful in solubilizing macromolecules or polymers.

DETAILED DESCRIPTION OF THE INVENTION

Figure 1:
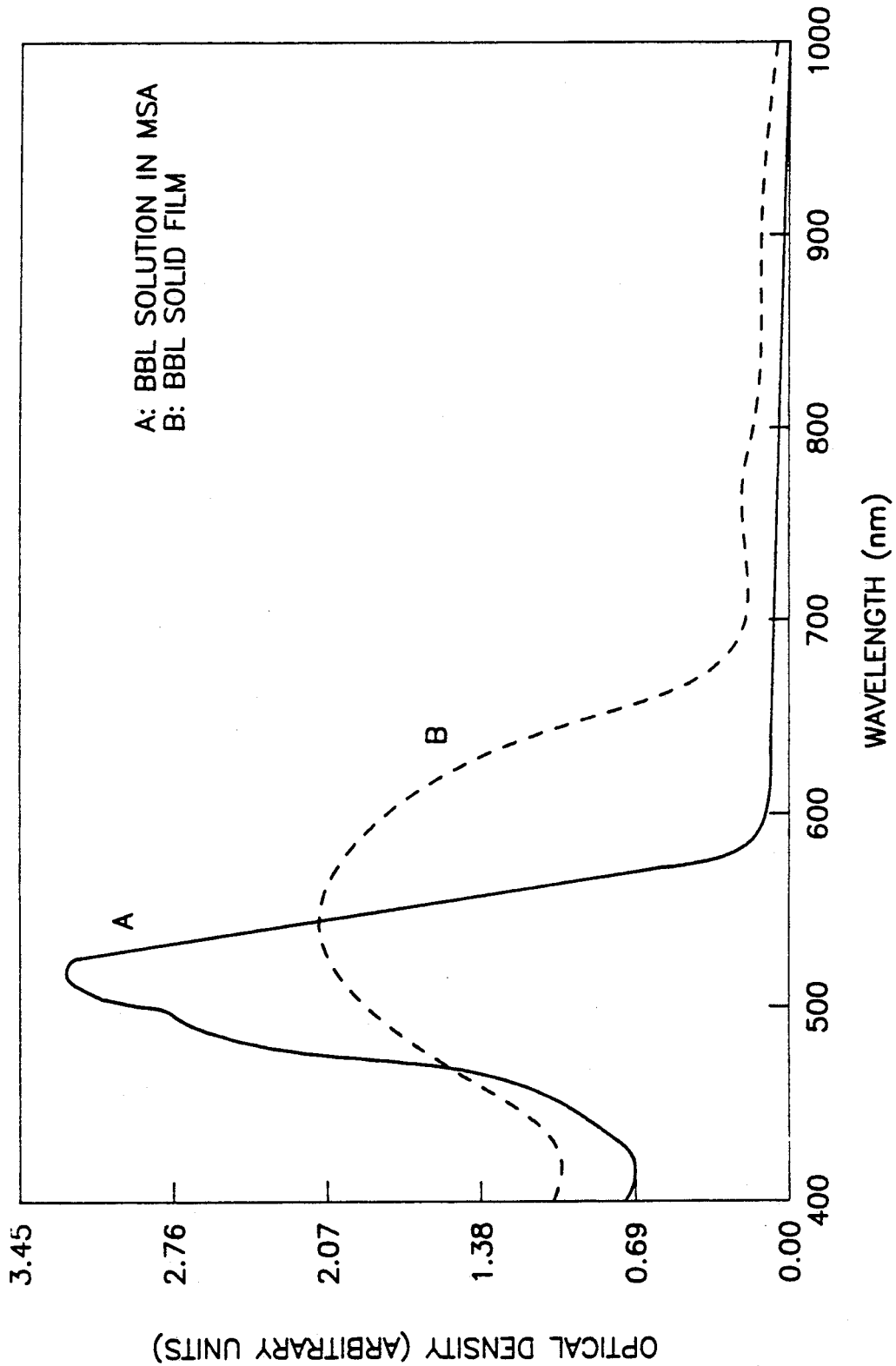
FIG. 1 illustrates the electronic absorption spectra of a rigid macromolecule (BBL) in acidic solvent and in the solid state.

The present invention stems from the discovery of novel aprotic organic solvent systems capable of solubilizing many rigid chain macromolecules, thus allowing the preparation of solutions of the macromolecules. As discussed previously, many rigid chain macromolecules such as those in structures I-XIV do not dissolve in aprotic organic solvents such as nitroalkanes, nitrobenzene, 1,2-dichloroethane, etc. However, the inventors herein have discovered that by adding metal halide Lewis acids (MX$_n$) to certain aprotic organic solvents useful new organic liquids that dissolve rigid chain macromolecules are obtained. The addition of Lewis acids to aprotic organic solvents changes the solvating properties of the neat aprotic organic solvents particularly with respect to electron donor and acceptor properties.

Suitable Lewis acids include the metal halide compounds MX$_n$ where M is a metallic element from the list enumerated above, X is a halide atom, and n = 1, 2, 3, 4, 5, or 6. Some preferred metal halide Lewis acid MX$_n$ species include FeCl$_3$, SbCl$_3$, InCl$_3$, AlCl$_3$, SbCl$_5$, AlBr$_3$, AlI$_3$, GaCl$_3$, BCl$_3$, GaBr$_3$, GaI$_3$, GaCl$_2$, FeCl$_2$, InBr$_3$, InI$_3$, SnCl$_4$, TiCl$_4$, TiBr$_4$, ZrCl$_4$, HfCl$_4$, SbF$_5$, AuCl$_3$, ZrBr$_4$, ZrI$_4$, PtCl$_4$, ReCl$_3$, ReCl$_5$, WCl$_6$, MoCl$_5$, MoF$_6$, TaCl$_5$, TaBr$_5$, TaF$_5$, NbF$_5$, NbCl$_5$, and AsF$_3$.

Suitable aprotic organic solvents include those with a combination of low electron donor and high electron acceptor properties. A quantitative measure of the electron donor (i.e., nucleophilic) properties of a solvent is the so-called "donor number," DN, which is defined as the molar enthalpy value for the complex formation between the reference electron acceptor SbCl$_5$ and the solvent molecules in dilute solutions of 1, 2-dichloroethane (DCE). A similar independent quantitative measure of electron acceptor (electrophilic) properties is the "acceptor number," AN, which is spectroscopically defined. Suitable neat aprotic organic solvents generally have a donor number not greater than 10 or, in case of solvent mixtures, at least one of the aprotic organic solvents should have a donor number less than or equal to 10. Thus, suitable aprotic organic solvents include the nitroalkanes and nitroarenes, such as nitromethane (DN =2.7), nitroethane, 1-nitropropane, 2-nitropropane, and nitrobenzene (DN =4.4), nitroxylenes, 1, 2-dichloro-ethane (DN =0.0), chlorobenzene, nitrotoluenes, toluene, p-xylene, benzene (DN =0.1), benzoyl chloride (DN =2.3), thionyl chloride (DN =0.4), tetrachloroethylene carbonate (DN =0.8), dichloroethylene carbonate (DN =3.2), benzyl fluoride (DN =2.0), and their mixtures. In addition to a low donor number, a suitable neat aprotic organic solvent or mixture of aprotic organic solvents should exhibit a moderate to high dielectric constant ($\epsilon'$>10).

The suitable concentrations of the Lewis acid(s) in the aprotic organic solvent(s) needed to prepare effective organic liquids for solubilizing polymers are generally in the range of 0.01 Molar to 8 Molar or from 0.01 Molar up to the limit of solubility (saturated solution). The preferred amount of Lewis acid in the organic liquid is generally from 0.1% (wt) to 60% (wt) or saturated solution.

The solvent systems of the present invention have been prepared by stirring (mechanically or magnetically) a mixture of the appropriate amounts of suitable Lewis acids and suitable aprotic organic solvents to obtain the liquid solvents. The mixing and stirring can be at any temperature from ambient up to just below the boiling points of the neat aprotic organic solvent; higher temperatures above ambient accelerate the dissolution process. In the case of hygroscopic Lewis acids, such as anhydrous AlCl$_3$, the weighing, mixing and dissolution were done in inert atmospheres such as in a dry box or under inert gas.

Without further elaboration, it is believed that one skilled in the art can using the preceding description, utilize the present invention to its fullest extent. The following specific embodiments are, therefore, to be construed as merely illustrative, and not limitative of the remainder of the disclosure in any way whatsoever. The methods of complexation, processing and recovery of the rigid polymers according to the present invention and their utilization are thus further illustrated by the following examples:

EXAMPLES 1-10

In examples 1-10 three each of ten different organic liquid systems were prepared from FeCl$_3$ and the following neat aprotic organic solvents: (1) nitromethane (bp=101° C.), (2) nitroethane (bp=114° C.), (3) 1-nitropropane (bp=131° C.), (4) 2-nitropropane (bp =120° C.), (5) nitrobenzene (BP=211° C.), (6) MeNO$_2$/Et- NO$_2$ (50/50), (7) MeNO$_2$/PhNO$_2$ (50/50), (8) EtNO$_2$/PhNO$_2$ (50/50), (9) MeNO$_2$/2-nitropropane (50/50), and (10) EtNO$_2$/1-nitropropane (50/50). Three concentrations of FeCl$_3$, 0.05 Molar, 0.1M (1.4% wt), and 0.3M (4.1% wt), in each of the ten neat aprotic organic solvents were prepared in jars at ambient conditions.

Whereas, none of the ten neat aprotic organic liquids would dissolve any of the rigid macromolecules of structures I-XIV, it was found that each of the thirty (30) FeCl$_3$/aprotic organic solvents dissolved at least some of these macromolecules including those of structures IV (BBL), X (DHTAP), XI (BBB), and XII (Cis-BB). The polymer of structure II (PBT) either swelled or was partially soluble. The polymers of structures IX and XIV were notably insoluble in the organic solvents systems of examples 1-10.

EXAMPLES 11-20

Both saturated solutions and 0.5M solutions of InCl$_3$ in the ten neat aprotic organic solvents of examples 1-10 were prepared at ambient conditions. The resulting organic solvent systems constitute examples 11-20 and were found to solubilize DHTAP to give deep blue to blue-green solutions. However, the ladder polymer of structure IX was insoluble in the solvent systems of examples 11-20.

EXAMPLES 21-36

In examples 21-36 aluminum chloride (AlCl$_3$) solutions in the ten neat aprotic organic solvents of examples 1-10 as well as in the following neat aprotic solvents were prepared (31) 1, 2-dichloroethane, (32) benzoyl chloride, (33) thionyl chloride, (34) benzene, (35) toluene, and (36) chlorobenzene. Several concentrations of AlCl$_3$ in these sixteen neat liquids were prepared as in examples 1-10, except that the solutions were prepared in a dry box filled with N$_2$ including 1, 3, 5, 10, 15, 20, 25 and 30% (wt) AlCl$_3$. The resulting solvent systems were found to solubilize many polymers, including the rigid chain macromolecules BBB, BBL, cis-BB, PBT, PBO, polyimides (structure XIV), poly (p-phenylene sulfide) (PPS) (structure XIX), etc. However, AlCl$_3$/p-xylene and AlCl$_3$/1,2-dichloroethane solvent systems only partially dissolved rigid chain macromolecules but the related liquids AlCl$_3$/MeNO$_2$/p-xylene (60/40) and AlCl$_3$/MeNO$_2$/1,2-dicholorethane (60/40) were more effective at solubilizing the polymers.

Example 37

A 3.2M AlCl$_3$/MeNO$_2$ solvent was prepared under nitrogen in a dry box. Concentraed polymer solutions were prepared, including 6-9% (wt) BBL and 10% (wt) BBB. The 8-9% (wt) BBL solutions in 3.2M AlCl$_3$/MeNO$_2$ appear to exhibit anisotropic morphology (nematic liquid-crystalline phase) whereas lower concentrations exhibited isotropic morphology. The 10% wt BBB solution in this solvent was isotropic.

EXAMPLES 38-85

In examples 38-85 solvent systems were prepared from SbCl$_3$, SbCl$_5$, and SbF$_5$ and the sixteen neat aprotic organic solvents of examples 21-36 and following the procedures of examples 21-36. The concentration of the Lewis acids was in the range 2-28.9% (wt). The resulting solvent systems at roomo temperature were found to be effective for dissolving many polymers, including most of the rigid chain macromolecules of structures I to XIV and XIX. However, SbCl$_5$/benzene, SbCl$_5$/toluene, SbCl$_5$/chlorobenzene, and SbCl$_5$/p-xylene solvent systems could not solubilize BBB, PBT, BBL, and aromatic polyimides even at Lewis acid concentrations as high as 25-32% wt. Warming the solvent systems to 60° C. significantly improved the number and amount of polymer solubilized and the dissolution rate.

EXAMPLES 86-185

In examples 86-185 the Lewis acids AlBr$_3$, AlI$_3$, GaCl$_3$, GaBr$_3$, GaI$_3$, TiCl$_4$, SnCl$_4$, MoCl$_6$, TaCl$_5$, and BCl$_3$ were used to prepare organic solvent systems at various concentrations from 1% wt up to saturation or limits of miscibility in the, ten neat aprotic organic solvents in examples 1-10. The resulting solvent systems were found to be effective at solubilizing many polymers, including most of the rigid chain macromolecules of structures I to XIV and XIX.

Properties of Lewis Acid/Organic Solvent Systems

The solvation power of any solvent is a complicated quantity which depends on various factors such as structure, polarity, basicity, acidity, donor number (DN), and acceptor number (AN) of the solvent as well as on similar properties of the substrate to be solubilized. Of the classical solvent parameters such as dipole moment, polarizability, dielectric constant ($\epsilon'$), and solubility parameter ($\delta$), $\delta$ values have been widely used to predict solubility of a given polymer in a given solvent. Unfortunately, the solubility parameter of organic solvents does not correctly predict solubility of rigid chain macromolecules such as in structures I-XIV. Contrary to what might be predicted based on solubility parameter values for organic solvents and the rigid chain polymers, the polymers were insoluble. For example, the calculated solubility parameter of PBT is about 12.8 which predicts that it should be soluble in ethanol or nitromethane as both have a solubility parameter of 12.7. However, PBT is insoluble in both of these solvents. The strong protonic acids such as concentrated sulfuric acid, methanesulfonic acid, and trifluoromethanesulfonic acid which heretofore generally dissolved the rigid chain macromolecules have a very high acceptor number (AN $>$ 100) and solubilize via protonation of the rigid macromolecules.

The present solvent systems based on aprotic organic solvents containing Lewis acids provide a novel general mechanism of solubilization of rigid chain thermally stable polymers. The solvation properties of an organic solvent, including its donor and acceptor numbers (DN, AN), are radically changed by the addition of Lewis acids. For example, in Table 1 it is seen that the acceptor number of neat 1,2-dichloroethane (DCE) is increased about six-fold to 100 due to the addition of SbCl$_5$. Thus, by adding metal halide Lewis acids to organic solvents, organic liquids with as powerful the solvation properties as concentrated protonic acids can be obtained without the previously enumerated drawbacks of the latter.

Figure 2:
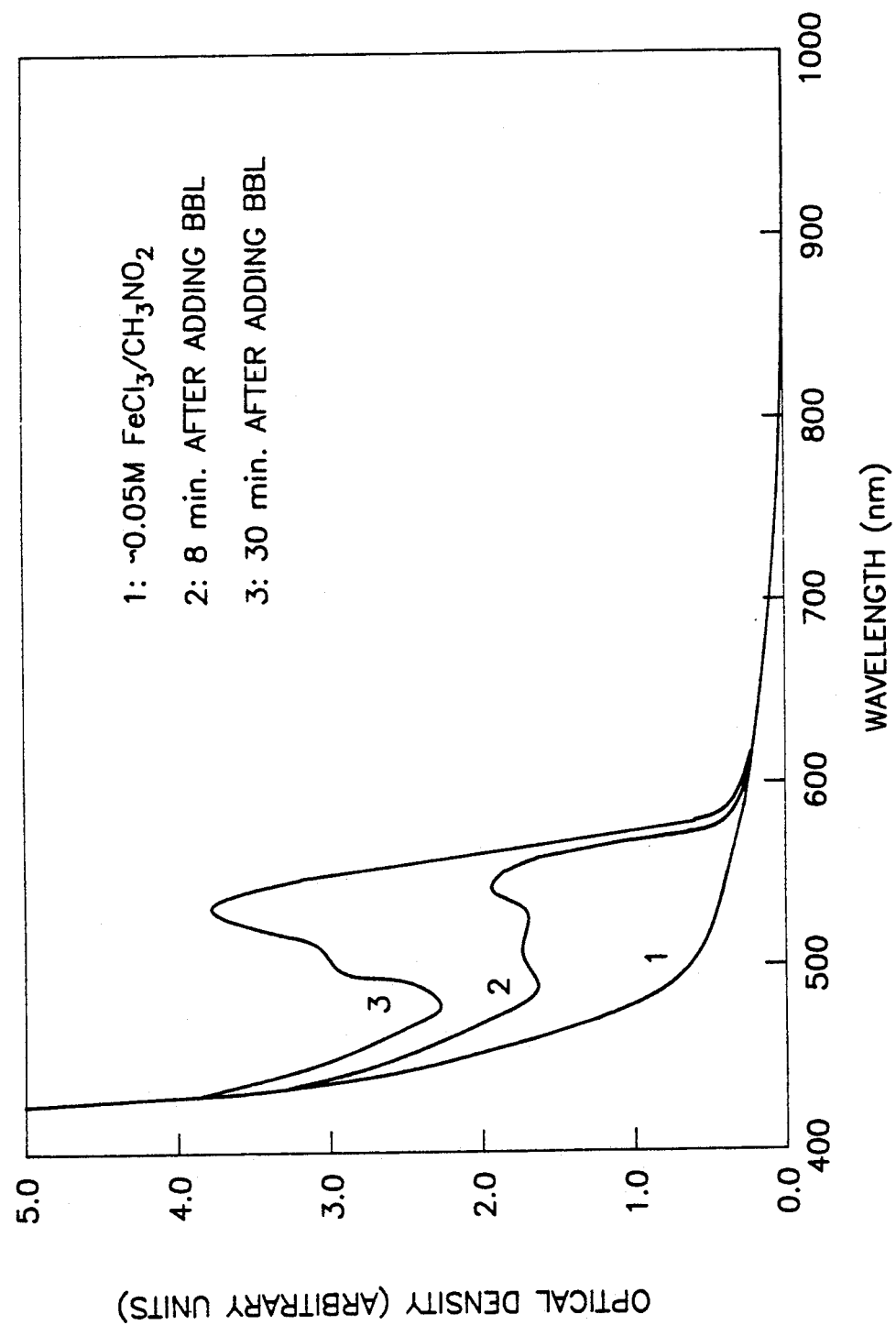
FIG. 2 shows the electronic absorption spectra of the same rigid chain macromelcule (BBL), as in FIG. 1, in a certain organic solvent of the present invention.

Plot A of FIG. 1 shows the electronic absorption spectrum of BBL in concentrated (100%) methanesulfonic acid (MSA) and plot B of FIG. 1 shows the electronic spectrum of a thin BBL film cast from the acid solution. FIG. 2 shows the electronic absorption spectrum of the same BBL sample in 0.05M FeCl$_3$/nitromethane at two polymer concentrations compared to the solvent. The similarity of the solution electronic spectra in plot of FIG. 1 and FIG. 2 is clear. The optical absorption maximum ($\lambda_{max}$) in the electronic absorption spectra of BBL in the solid state, in protic acid solution, and in the aprotic organic solvent systems of the present invention are further compared in Table 2.

TABLE 1

Properties of Some Solvents

| Solvent | b.p. (°C.)* | $\epsilon'$* | donor number[+] (DN) | acceptor number[+] (AN) |
|---|---|---|---|---|
| 1. Nitromethane (NM) | 101 | 35.7 | 2.7 | 20.5 |
| 2. Nitroethane (NE) | 114 | 28.06 | — | — |
| 3. 1-Nitropropane (1-NP) | 131 | 23.24 | — | — |
| 4. 2-Nitropropane (2-NP) | 120 | 25.5 | — | — |
| 5. Nitrobenzene (NB) | 211 | 34.82 | 4.4 | 14.8 |
| 6. N,N-Dimethylformamide (DMF) | 153 | 36.7 | 26.6 | 16.0 |
| 7. N,N-Dimethylacetamide (DMAc) | 166 | 37.78 | 27.8 | 13.6 |
| 8. N-methyl-2-pyrrolidone (NMP) | 202 | 32.0 | 27.3 | 13.3 |
| 9. Acetonitrile (MeCN) | 81.6 | 37.5 | 14.1 | 18.9 |
| 10. N,N-Dimethylsulfoxide (DMSO) | 189 | 46.68 | 29.8 | 19.3 |
| 11. Methanol (MeOH) | 65 | 32.63 | 19.1 | 41.5 |
| 12. Acetone | 56 | 21.6 | 17.0 | 12.5 |
| 13. Water | 100 | 78 | 16.4 | 54.8 |
| 14. Acetic acid | 118 | 6.15 | — | 52.9 |
| 15. 1,2-Dichloroethane (DCE) | 83.5 | 10.36 | 0.0 | 16.7 |
| 16. SbCl$_5$/DCE | — | — | — | 100.0 |
| 17. Sulfuric acid | — | — | — | |
| 18. Methanesulfonic acid (MSA) | — | — | — | 126.1 |
| 19. Trifluoroacetic acid | 71.78 | 8.55 | — | 105.3 |
| 20. Trifluoromethanesulfonic acid | 161 | — | — | 131.7 |

*J. A. Riddick and W. B. Bunger, Techniques of Organic Chemistry, vol. 2, Organic Solvents, 3rd ed., Wiley-Interscience, New York, 1970.
[+]V. Gutmann, The Donor-Acceptor Approach to Molecular Interactions, Plenum Press, New York, 1978.

TABLE 2

Optical Absorption Maximum of BBL in Various Solvents and in the Solid State

| Solvent | $\lambda_{max}$(nm) | $\lambda_{max}$-560 (nm) |
|---|---|---|
| 100% MSA | 544 | 16 |
| FeCl$_3$/CH$_3$NO$_2$ | 546 | 14 |
| AlCl$_3$/CH$_3$NO$_2$ | 546 | 14 |
| SbCl$_3$/CH$_3$NO$_2$ | 550 | 10 |
| AlCl$_3$/Ph-NO$_2$ | 557 | 3 |
| SbCl$_3$/Ph-NO$_2$ | 557 | 3 |
| BBL thin solid film | 560 | 0 |

The boiling point (bp) of the present Lewis acid/aprotic organic solvents is practically the same as the value for the neat aprotic organic solvents. This fact is important and advantageous in the application of the solvents for solution processing to films, coatings, and fibers of the relevant polymers solubilized in the solvents.

The amount of polymer solubilized in the aprotic organic solvents containing Lewis acids increase with increasing amounts of the Lewis acids in solution. For example, up to 9% wt of BBL solutions in 3M AlCl$_3$/R-NO$_2$ (MeNO$_2$, EtNO$_2$, etc.) have been prepared. This is about twice the highest possible concentration of the same BBL in methanesulfonic acid solutions that can be prepared.

It should further be noted that the solvent systems disclosed and contemplated by the present invention may be useful with respect to almost any solution process or treatment of the macromolecules or polymers solubilized therein. For example, such solutions may be used for oligomer formation, polymerization, catalyses, solution processing and other reactions or treatments.

What is claimed is:

1. A method of solubilizing organic macromolecules comprising chain or ladder polymers, the method comprising the step of contacting the macromolecules with a solvent system, the solvent system comprising:

an amount of at least one Lewis acid of the formula MX$_n$, where M is an element selected from the group consisting of metallic elements from the Periodic Table and elements exhibiting metallic characteristics in MX$_n$, X is an halogen selected from F, Cl, Br and I and n is an integer from 1 to 6; and an amount of at least one aprotic organic solvent selected from the group of aprotic solvents consisting of those exhibiting relatively low electron donor properties (a donor number $\leq$ 10).

2. A method of solubilizing organic macromolecules comprising chain or ladder polymers, the method comprising the step of contacting the organic macromolecules with a solvent system, the solvent system further comprising:

an amount of at least one Lewis acid of the formula MX$_n$, where M is a metallic element or an element exhibiting metallic characteristics in MX$_n$ selected from the group consisting of Al, B, Ga, Fe, In, Sn, Sb, Ti, Zr, Hf, Nb, Ta, Mo, Ca, W, Pt, Re, Zn, Bi, As, Ir, M, Au, Cu, Cr, Wo, V, Yb, Y, Nd, Co, Os, Cd, Cs, Be, Ge, Rh, Ni, Pd, Tm, Tb, Te, Sc, Dz, Er, Eu, La, Lu, Sm, Pr, Ru, X is an halogen selected from F, Cl, Br, and I and n is an integer from 1 to 6; and an amount of at least one aprotic organic solvent from the group consisting of solvents exhibiting relatively low electron donor properties (donor number $\leq$ 10).

3. A method of solubilizing organic macromolecules comprising chain or ladder polymers comprising the step of contacting the organic macromolecules with an organic solvent system, the organic solvent system further comprising:

an amount of at least one Lewis acid of the formula MX$_n$ where M is selected from the group of elements consisting of Fe, Al, In, Sb, Ga, Ti, Sn, Mo, Ta and B, X is an halogen selected from F, Cl, Br and I and n is an integer from 2–6; and an amount of one or more solvents selected from the group consisting of nitromethane, nitroethane, 1- nitropropane, nitrobenzene, 2-nitropropane, 1,2-dichloroethane, benzoyl chloride, benzene, toluene, xylene, and chlorobenzene or a combination thereof.

4. A method of solubilizing organic macromolecules comprising the step of contacting the organic macromolecules with a solvent system, the solvent system further comprising:
   an amount of at least one Lewis acid from the group consisting of $AlCl_3$, $FeCl_3$, $GaCl_3$, $SbCl_5$, $AsF_3$ and $SbF_5$; and
   an amount of at least one aprotic organic solvent from a class consisting of solvents exhibiting relatively low electron donor properties (donor number $\leq 10$).

5. A method of solubilizing organic macromolecules comprising chain or ladder polymers of interest, the method comprising the step of contacting the organic polymers of interest with an organic solvent system, the solvent system further comprising:
   an amount of at least one Lewis acid selected from the group consisting of $AlCl_3$, $FeCl_3$, $GaCl_3$, $SbCl_3$, $SbCl_5$, $AsF_3$ and $SbF_5$; and
   an amount of one or more aprotic organic solvents selected from the group consisting of nitroalkanes having from 1 to 6 carbon atoms, nitrobenzene, 1,2-dichloroethane, benzene, toluene, xylene, and chlorobenzene.

6. The method of claim 5 wherein the organic polymer of interest is poly(p-phenylene-2,6-benzobisthiazole) (PBT) and wherein the organic solvent system consists of an amount of the Lewis acid $AlCl_3$ and an amount of the organic solvent nitromethane.

7. The method of claim 5 wherein the Lewis acid is $AlCl_3$ and the aprotic organic solvent is nitromethane.

8. The method of claim 7 wherein the organic macromolecule is poly(p-phenylene-2,6-benzobisoxazole) (PBO).

9. The method of claim 7 wherein the organic macromolecule is benzimidazobenzo-phenanthroline) (BBL).

10. The method of claim 7 wherein the organic macromolecule is polybenzimidazobenzo-phenanthroine) (BBB).

11. The method of claim 7 wherein the organic macromolecule is poly(p-phenylene-2,6-benzimidazole) (PBI).

12. The method of claim 5 wherein the Lewis acid is $GaCl_3$ and the aprotic solvent is nitromethane.

13. The method of claim 12 wherein the organic macromolecule is poly(p-phenylene-2,6-benzobisoxazole) (PBO).

14. The method of claim 12 wherein the organic macromolecule is benzimidazobenzo-phenanthroline) (BBL).

15. The method of claim 12 wherein the organic macromolecule is polybenzimidazobenzo-phenanthroline) (BBB).

16. The method of claim 12 wherein the organic macromolecule is poly(p-phenylene-2,6-benzimidazole) (PBI).

17. The method of claim 12 wherein the organic macromolecule is poly(p-phenylene-2,6-benzobisthiazole) (PBT).

18. A method of solubilizing organic macromolecules comprising chain or ladder polymers comprising the step of contacting the organic macromolecules with a solvent system comprising:
   an amount of at least one Lewis acid of the formula $MX_n$ where M is selected from the group of elements consisting of Fe, Al, In, Sb, Ga, Ti, Sn, Mo, Ta and B, X is an halogen selected from F, Cl, Br and I and n is an integer from 2–6; and
   an amount of thionyl chloride.

19. The method of claim 1 including at least one organic solvent having a relative high dielectric constant ($\epsilon' \geq 10$).

20. The method of claim 2 including at least one organic solvent having relatively high dielectric constant ($\epsilon' \geq 10$).

21. The method of claim 1 wherein the concentration of Lewis acid in the organic solvent is in the range from about 0.01M, 0.1% (wt), to saturation.

22. The method of claim 2 wherein the concentration of Lewis acid in the organic solvent is in the range from about 0.01M, 0.1% (wt), to saturation.

23. The method of claim 3 wherein the concentration of Lewis acid in the organic solvent is in the range from about 0.01M, 0.1% (wt), to saturation.

24. The method of claim 4 including at least one organic solvent having a relative high dielectric constant ($\epsilon' \geq 10$).

25. The method of claim 4 wherein the concentration of Lewis acid in the organic solvent is in the range from about 0.01M, 0.1% (wt), to saturation.

26. The method of claim 5 wherein the concentration of Lewis acid in the organic solvents is in the range from about 0.01M, 0.1% (wt), to saturation.

27. The method of claim 5 wherein said Lewis acid is selected from $AlCl_3$, $FeCl_3$ and $GaCl_3$ or a mixture thereof and said aprotic solvent is selected from the said nitroalkane and nitrobenzene or mixtures thereof.

28. The method of claim 5 wherein said solvent system contain a mixture of aprotic organic solvents.

29. The method of claim 27 wherein said solvent system contain a mixture of aprotic organic solvents.

30. The method of claim 27 wherein said Lewis acid is selected from $AlCl_3$ and $GaCl_3$ and combinations thereof and said aprotic solvent is a nitroalkane.

31. The method of claim 30 wherein said aprotic solvent is nitromethane.

32. The method of claim 30 wherein said Lewis acid is $GaCl_3$ and said aprotic solvent is a nitroalkane.

33. The method of claim 30 wherein said Lewis acid is $GaCl_3$ and said aprotic solvent is nitromethane.

* * * * *